(12) United States Patent
Gits et al.

(10) Patent No.: US 7,246,145 B1
(45) Date of Patent: Jul. 17, 2007

(54) FULLY DISTRIBUTED, SCALABLE INFRASTRUCTURE, COMMUNICATION SYSTEM

(75) Inventors: Peter Michael Gits, Agoura Hills, CA (US); Dale J. Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 09/676,147

(22) Filed: Sep. 29, 2000

Related U.S. Application Data (60) Provisional application No. 60/223,824, filed on Aug. 8, 2000.

(51) Int. Cl.
G06F 15/16 (2006.01)

(52) U.S. Cl. .................. 709/202; 709/223; 709/249

(58) Field of Classification Search ............. 709/232, 709/246, 248, 313, 201–203, 230, 223, 224, 709/243, 249; 707/201, 203, 10, 200
See application file for complete search history.

(56) References Cited

U.S. PATENT DOCUMENTS

| | | | |
|---|---|---|---|
| 4,585,906 A | 4/1986 | Matthews et al. ........ 379/88.26 |
| 4,972,367 A | 11/1990 | Burke ..................... 707/10 |
| 5,049,873 A | 9/1991 | Robins et al. ......... 340/825.01 |
| 5,299,207 A | 3/1994 | Fujii .................... 714/45 |
| 5,327,486 A | 7/1994 | Wolff et al. ............ 379/93.23 |
| 5,432,839 A | 7/1995 | DeLuca ................ 340/7.21 |
| 5,493,692 A | 2/1996 | Theimer et al. ........ 455/26.1 |
| 5,524,137 A | 6/1996 | Rhee .................... 379/88.01 |
| 5,638,514 A | 6/1997 | Yoshida et al. ......... 709/224 |
| 5,742,905 A | 4/1998 | Pepe et al. ............. 455/461 |
| 5,787,262 A | 7/1998 | Shakib et al. |
| 5,799,306 A | 8/1998 | Sun et al. |
| 5,809,478 A | 9/1998 | Greco |
| 5,848,419 A | 12/1998 | Hapner et al. |
| 5,867,495 A | 2/1999 | Elliott et al. |
| 5,884,324 A * | 3/1999 | Cheng et al. ............ 707/201 |
| 5,905,789 A | 5/1999 | Will .................... 379/211.03 |
| 5,928,325 A | 7/1999 | Shaughnessy et al. ...... 709/206 |
| 5,953,050 A | 9/1999 | Kamata et al. |
| 6,009,103 A | 12/1999 | Woundy .................. 370/401 |

(Continued)

OTHER PUBLICATIONS

Oppen, Derek C.; and Dalal, Yogen K., "The Clearinghouse: A Decentralized Agent for Locating Named Objects in a Distributed Environment," ACM Transactions on Information Systems (TOIS), ACM Press, Jul. 1983, vol. 1, Issue 3, pp. 230-253.*

(Continued)

Primary Examiner—Bunjob Jaroenchonwanit
Assistant Examiner—Victor Lesniewski
(74) Attorney, Agent, or Firm—Marger Johnson & McCollom, P.C.

(57) ABSTRACT

A fully distributed, scalable infrastructure, communication system. The system comprises at least on Space, at least one double agent and at least one non-space specific double agent. Devices and applications that wish to communicate with other members of the Community or outside of the Community insert objects into the Space. The Space then publishes the presence of that object to subscribed members of the community. The double agents are capable of communicating with any desired protocols on one side and the Space protocol on the other. Non-space specific agents handle routing, administrative and other tasks, such as communication between Spaces and Communities.

16 Claims, 3 Drawing Sheets

U.S. PATENT DOCUMENTS

| | | | | |
|---|---|---|---|---|
| 6,029,175 | A * | 2/2000 | Chow et al. | 707/104.1 |
| 6,049,819 | A * | 4/2000 | Buckle et al. | 709/202 |
| 6,061,740 | A | 5/2000 | Ferguson et al. | |
| 6,072,522 | A | 6/2000 | Ippolito | |
| 6,091,811 | A | 7/2000 | Chang et al. | 379/265.02 |
| 6,091,948 | A | 7/2000 | Carr et al. | 455/414.1 |
| 6,092,102 | A | 7/2000 | Wagner | 340/7.29 |
| 6,094,213 | A | 7/2000 | Mun et al. | |
| 6,137,876 | A | 10/2000 | Wong et al. | 379/246 |
| 6,161,137 | A | 12/2000 | Ogdon et al. | |
| 6,170,015 | B1 * | 1/2001 | Lavian | 709/232 |
| 6,226,666 | B1 | 5/2001 | Chang | |
| 6,229,803 | B1 * | 5/2001 | Bog et al. | 370/352 |
| 6,249,570 | B1 | 6/2001 | Glowny et al. | 379/88.22 |
| 6,253,256 | B1 * | 6/2001 | Wollrath et al. | 719/330 |
| 6,256,663 | B1 | 7/2001 | Davis | |
| 6,335,927 | B1 | 1/2002 | Elliott et al. | |
| 6,353,661 | B1 | 3/2002 | Bailey, III | 379/93.25 |
| 6,373,517 | B1 | 4/2002 | Davis et al. | |
| 6,412,017 | B1 * | 6/2002 | Straube et al. | 719/313 |
| 6,421,686 | B1 * | 7/2002 | Martin, Jr. | 707/201 |
| 6,434,594 | B1 | 8/2002 | Wesemann | |
| 6,442,565 | B1 | 8/2002 | Tyra et al. | |
| 6,457,065 | B1 | 9/2002 | Rich et al. | 709/328 |
| 6,463,446 | B1 | 10/2002 | Wollrath et al. | |
| 6,487,594 | B1 * | 11/2002 | Bahlmann | 707/10 |
| 6,493,671 | B1 | 12/2002 | Ladd | |
| 6,496,871 | B1 * | 12/2002 | Jagannathan et al. | 709/202 |
| 6,559,863 | B1 | 5/2003 | Meggido | |
| 6,564,216 | B2 | 5/2003 | Waters | 707/10 |
| 6,578,074 | B1 | 6/2003 | Bahlmann | 709/220 |
| 6,587,455 | B1 | 7/2003 | Ray et al. | 370/352 |
| 6,591,272 | B1 * | 7/2003 | Williams | 707/102 |
| 6,615,223 | B1 * | 9/2003 | Shih et al. | 707/201 |
| 6,636,238 | B1 | 10/2003 | Amir et al. | |
| 6,643,650 | B1 | 11/2003 | Slaughter et al. | |
| 6,643,652 | B2 * | 11/2003 | Helgeson et al. | 707/10 |
| 6,697,806 | B1 | 2/2004 | Cook | 707/10 |
| 6,714,979 | B1 | 3/2004 | Brandt et al. | 709/225 |
| 6,724,896 | B1 | 4/2004 | Beckett et al. | 380/49 |
| 6,751,657 | B1 | 6/2004 | Zothner | 709/200 |
| 6,788,980 | B1 | 9/2004 | Johnson | |
| 6,789,077 | B1 * | 9/2004 | Slaughter et al. | 707/10 |
| 6,792,466 | B1 | 9/2004 | Saulpaugh | |
| 6,795,108 | B2 | 9/2004 | Jarboe et al. | |
| 6,859,931 | B1 | 2/2005 | Cheyer et al. | |
| 6,868,543 | B1 * | 3/2005 | Nusbickel | 719/318 |

OTHER PUBLICATIONS

Sixtensson, Andres; and Ye, Wenchuan, "Reuse in the Telecommunication Domain Using Object Oriented Technology and Ada," Proceedings of the 7th Washington Ada Symposium on Ada (WADAS), ACM Press, Jun. 1990, pp. 231-239.*

Taina, Juha; and Raatikainen, Kimmo, "RODAIN: A Real-Time Object-Oriented Database System for Telecommunications," Proceedings of the Workshop on Databases: Active and Real-Time; ACM Press, Nov. 1996, pp. 10-14.*

Levasseur, Gerald A., "An Object-Oriented Phone Center Model Using Simple++," Proceedings of the 28th Conference on Simulation, ACM Press, Nov. 1996, pp. 556-563.*

Gbaguidi, Constant; Hubaux, Jean-Pierre; and Hamdi, Maher, "A Programmable Architecture for the Provision of Hybrid Services," IEEE Communciations Magazine, Jul. 1999, vol. 37, Issue 7, pp. 110-116.*

Alberi, James; Cochinwala, Munir; Cohen, Ernie; Jackson, Namon; Pucci Marc; and Sigman, Eric, "An Object-Based Framework for Communications Services," IEEE Service Portability and Virtual Customer Environments, Dec. 2000, pp. 109-112.*

Benedicto, Regions: A Scalable Infrastructure for Scoped Service Location in Ubiquitous Computing, May 1999, Massachusetts Institute of Technology 1999, pp. 2-109.

Arnold, The Jini Architecture: Dynamic Services in a Flexible Netwotk, ACM, Jun. 1999.

Aschemann et al., A Framework for the Integration of Legacy Devices into a Jini Management Federation, Springer-Verlag, Oct. 1999.

* cited by examiner

FULLY DISTRIBUTED, SCALABLE INFRASTRUCTURE, COMMUNICATION SYSTEM

RELATED APPLICATIONS

This application is a continuation of, and claims priority to, US Provisional Patent Application 60/223,824 filed Aug. 8, 2000.

CROSS REFERENCE TO RELATED APPLICATIONS

This application relates to the following US patent applications, all commonly assigned to the assignee of this application.

| Serial No. | Title | Filed |
| --- | --- | --- |
| 09/698,779 | Smart Secretary | Oct. 27, 2000 |
| 09/711,378 | Replication of a Scalable Infrastructure System | Nov. 9, 2000 |
| 09/695,750 | Processing Events in a Communication System Using Agents | Oct. 24, 2000 |
| 09/746,798 | Address Services in a Scalable Infrastructure Communication System | Dec. 20, 2000 |
| 09/694,740 | Interconnective Agents in a Scalable Infrastructure System | Oct. 23, 2000 |
| 09/713,155 | Multicasting and Joining in a Scalable Infrastructure System | Nov. 14, 2000 |
| 09/697,821 | METHOD OF MANAGING A SCALABLE INFRASTRUCTURE COMMUNICATION SYSTEM | Oct. 26, 2000 |
| 09/882,221 | Net Lurkers | Jun. 15, 2001 |

BACKGROUND

1. Field

This disclosure relates to distributed communication systems, more particularly to a distributed application system using persistent stores and agents.

2. Background

Sun Corporation developed Java™, a three-part distributed means for computing. The three parts of Java™ are the Java™ programming language, the Java Virtual Machine™ (JVM) and the Java™ platform.

The Java™ programming language is just that, a programming language with its own syntax, structures and procedures similar to all other languages. It is the language in which Java™ applications such as applets, servlets, and JavaBeans™ components are written. A unique part of the Java™ language, however, is that it does not compile into machine-readable code, as most other languages do. It compiles into byte codes. These byte codes are interpretable by the JVM.

The JVM is the Java™ interpreter. Java™ programs are portable, being in byte code format, but they are only portable to platforms to which a Java™ interpreter has been ported. Fortunately, JVMs are freely available for virtually all types of systems, from desktop systems running Windows, Unix or Macintosh, to cell phones. All of these are capable of being a Java™ platform.

A platform typically identifies a set of application programming interfaces (APIs) typically defined by the operating system. A programmer writing a program to run on a specific operating system such as Windows would use a different set of APIs than a programmer writing a program for the Macintosh operating system. However, the Java™ platform provides APIs that run on any operating system running the Java™ platform. In some respects, the Java™ platform is an intermediate platform between the Java™ code and the operating system. It allows programmer to write a program once and run it anywhere.

Because Java™ code may run on several different operating systems and several different devices, it would seem a logical extension of this would be to connect these all together. Jini serves as the framework to make those connections. Jini is a set of specifications that allows different services to discover each other on a network. The specifications also allow these services to participate in operations on this network; the network is sometimes referred to as a community. However, to avoid confusion in further discussions the network will be referred to as a network or a Jini community.

Jini focuses on services. A service may also be thought of as a service interface. For example, a certain device such as a server may present an interface to the outside world that is the device API. This API interface is a service. Because Jini is a distributed framework, there will be clients and servers. However, these clients and servers only care about the interfaces that allow them access to the other clients and servers. The client or server will know about the particular service API, but does not care about the implementation. For example, there may be a printer on the network. Another member of the network will know that there is a printer API but does not care what kind of printer it is. The print service will allow the member to send a print job to the service and will handle the translation of the print job to the specific API for the printer.

One example of a Jini service is JavaSpaces™. Simply, JavaSpaces™ define a persistent store. In terms of the above discussion, a client that wants to use JavaSpaces™ only needs to know the JavaSpaces™ API. The client does not need to know the specifics on what type of server upon which the JavaSpaces™ is implemented.

From the above discussion, it would seem that the combination of Java™, Jini and JavaSpaces™ would provide an incredibly powerful, flexible means for establishing, running and reconfiguring networks. However, there are some limitations. For example, in order for Jini to function, as well as the JavaSpaces™, the Java™ language must exist in every device on the network whether client or server. Other minor weaknesses also exist, such as the required presence of a network, and the required presence of the devices that run JVM. Calls to a device that is temporarily unavailable are not allowed. Once a device goes off the network, anything addressed to it is removed as well.

The largest weakness in the current state of the art lies in the requirements of knowledge. Participants in a Jini community must know about each other's interfaces if they are to use each other. While the device sending the print job did not need to know the printer specifics in the above example, it did need to know the specifics of the print API. Service consumers and service providers must agree upon a common interface for the service to be used effectively. This restricts the application of these technologies to a fully distributed application system.

SUMMARY

One embodiment of the invention is a fully distributed, scalable infrastructure communication system. The system comprises at least one Space, at least one double agent and at least one non-space specific double agent. Devices and applications that wish to communicate with other members of the Community or outside of the Community insert objects into the Space. The Space then publishes the presence of that object to subscribed members of the community. The double agents are capable of communicating with any desired protocols on one side and the Space protocol on the other. Non-space specific agents handle routing, administrative and other tasks, such as communication between Spaces and Communities.

BRIEF DESCRIPTION OF THE DRAWINGS

The invention may be best understood by reading the disclosure with reference to the drawings, wherein.

DETAILED DESCRIPTION OF THE EMBODIMENTS

As mentioned above, there is a Jini term "community" used to refer to a network. The network is not any network; it must be a network running a Jini look-up service. The look-up service holds the registrations of all of the other services available in that particular Jini community. A new service must register itself with the Jini look-up service in order for other members of the community to find it and use it. The members of the Jini community find the look-up service by a process called discovery, which is a specified protocol at the network level.

However, the current state of registration and look-up can limit the Jini community unintentionally. If a member of the Jini community registers to a group called 'Group 1,' the look-up service assumes that all other services that want to be part of that group should register with 'Group 1.' There is no possibility of extending any of the registrants to operate in other communities or their respective participants.

Figure 1:
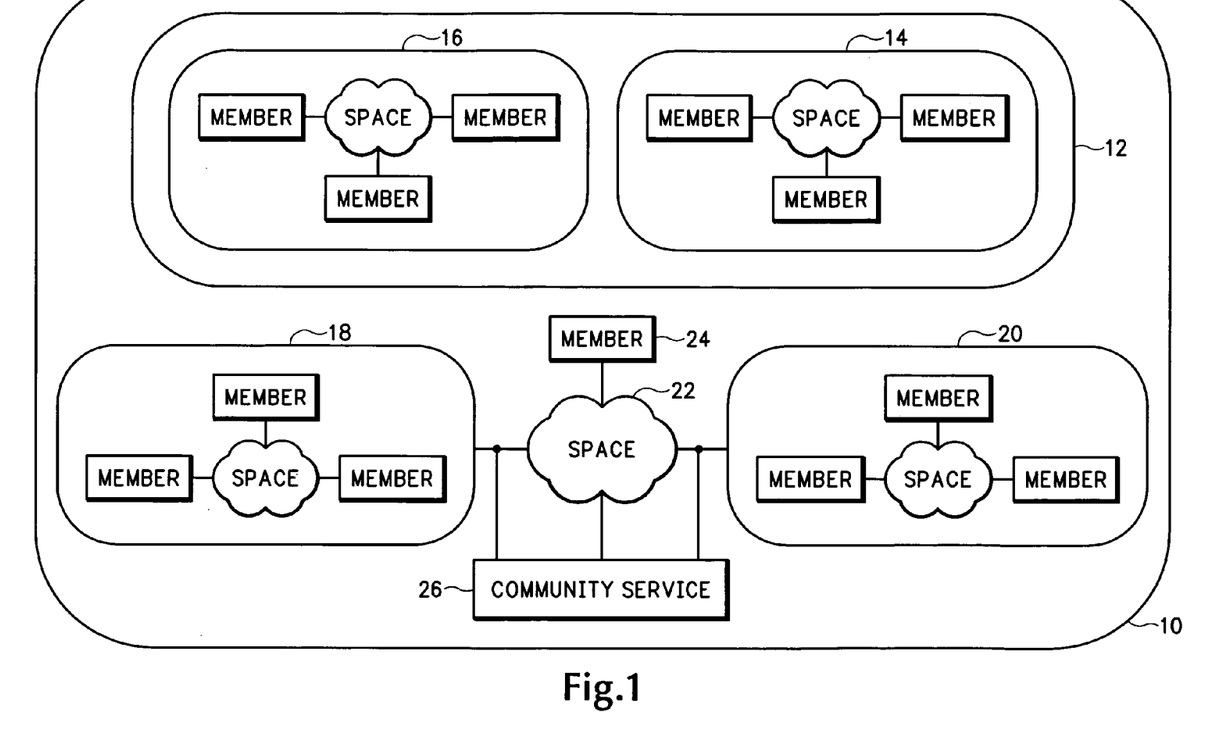
FIG. 1 shows one embodiment of a Scalable Infrastructure system, in accordance with the invention.

In one embodiment of the invention shown by FIG. 1, it is possible to deploy a Scalable Infrastructure (SI) fully distributed application system. The SI system uses a combination of a persistent store and agents to provide a communication system extensible to nearly all types of interfaces and any number of users and applications. The SI system defines Communities around the persistent store, or space, with space or non-space oriented interpreters, referred to here as Double Agents. Double Agents will be discussed in more detail further.

A Community as used here will refer to a collection of these agents and a persistent store. Any type of persistent store could be used, with the capabilities of having objects inserted into the store such that they do not lose their attributes and of providing a notification service as the objects are inserted. In this particular example, JavaSpaces™ will be used as the persistent stores, but the SI system is applicable to any similar technology. For ease of discussion, the persistent stores will be referred to as 'Spaces.' Spaces can be used in several different implementations, and the following discussion is meant only as an example.

FIG. 1 shows a Community 10. The Community 10 has several members 12, 20, 18 and 24 organized around a Space 22. It must be noted that the connections shown on this figure would indicate a hard-wired connection, that is typically not the case. This system will more than likely be implemented in software and these connections are virtual connections that dissolve and reform as needed to provide communications between the various members of the communities and between various communities.

As can be seen in FIG. 1, some of the members of the Community 10 could be individual devices or users such as that shown by member 24. Other members, such as those shown by members 20 and 18, can be Communities. Further, some members could be Communities of Communities, such as that shown by member 12. Member 12 is a Community made up of two other Communities 14 and 16.

This demonstrates the extensibility of an SI system. FIG. 1 shows one implementation and is only intended as an example. Application of the invention may result in far simpler or more complex structures of these Communities. Membership in the Community may change as new Communities are added and old ones are removed. These interactions are monitored and tracked with a Community Service, such as that shown in FIG. 1 at 26.

As mentioned before, one differentiating aspect of the SI system is the difference between a Jini community service and SI Community Service. The SI Community Service defines new qualities within the communication framework. The first is the formation of an SI Community. This relationship coordinates and defines a 'Virtual Space' for the agents within that Community to join. This defines the boundaries for all agents working within a single Community to function.

Second, the Service has the ability to link these separate Communities together without loosing their individual community properties. The Community Service defines the relationships of the framework without requiring the parts to understand the whole.

The third way is the self-healing piece of the Community Service where all the agents and services within a Community are monitored, stopped, re-started, and cloned without requiring administrative intervention.

Currently within the definition of a Jini community defined by Sun, there is a concept of a community and a federation that is limited by the service ability to register with a lookup service, as discussed briefly before. The lookup service acts as a broker and defines a loose set of "group/community" properties. While useful, it falls far short of being able to coordinate multiple spaces into a single "Virtual Space" and doesn't define any characteristics on inter-communication between the Jini communities and their respective entities and agents. The SI Community Service is another additional application layer that goes beyond the simple registration to a lookup service within a group.

The ability to tie multiple Spaces together and represent them as a "Virtual Space" within a Community enables the fault tolerance and distributed capabilities of the system. Without the Community Service, each agent would have to know the intimate details of all of the SI Spaces. Having a "Virtual Space" allows each agent to be notified of a registered event within each Space and provides additional scalability through distributed Spaces.

Once multiple SI Spaces form a single Community, the requirement for Communities to form relationships to other Communities exists and is represented within the SI community Service application. This ties two Communities together in a peer-to-peer fashion. The SI Community Service maintains these inter-community relationships.

The third advantage lies in having the agents register with the Community Service by getting a lease and renewing this lease that qualifies the agent's continued existence. The Community Service will be able to determine if an agent within a particular Community has stopped by its failure to renew its lease. The Community Service would then be responsible for launching another copy of that agent. This is also the single point of administrative control across all the Communities. Multiple Community Services should be running within the SI framework to provide the Community Service application additional fail-over and redundancy. Its behavior should also provide for persistent storage of the communities.

By maintaining the "wellness" information of agents and services within a Community, the Community Service also has the ability to launch new clones of these agents and services throughout the different communities based on load metrics. This provides for some dynamic distributed load behavior. For example, if "Group 1" where to be hit with a 1000 calls within a minute, the Community Service could launch another (N) agents anywhere within the Community to handle this increased load. This Service could also leverage addition hardware that is on standby to increase performance during peak loads. Alternatively, it could shut down lightly utilized agents and unused Services when the load decreases. Members interact with the Spaces via the agents, and unused agents can be removed to make room for new agents. Most of these agents are what will be referred to as 'double agents.'

Double agents are analogous to translation modules. They can communicate with one protocol on one side and the protocol used in the Space on the other. Each Space will have a set of dedicated double agents. For example, a Space with a phone member will have a phone double agent. It may interact according to a common protocol, such as SIP (session initiation protocol), with a SIP phone. It will then convert the request or other communication from the SIP phone to Space protocols. The Space protocol will more than likely involve a typing process to type the communication according to Java™ types and then placing it as an object in the Space.

Double agents are notified of new objects placed in the Space by a publish-and-subscribe process. Devices that interact with certain types of objects will subscribe with the Space to be notified when such an object is inserted into the Space. The Space then publishes the new object to all of the subscribed double agents. The subscribed double agents then pick it up from the Space. The object placed in the Space will be leased, and if no agent picks up the object before the lease expires, the object will be removed.

The nature of the double agents allows the system to be extremely scalable and extensible. If the system is to be made larger, a larger number of any type of double agents can be added. If more types of interfaces are needed, all the system requires to extend to include these are double agents written for those devices. The production of double agents is expedited by use of a class library, which will be discussed in more detail below.

An individual Community revolves around a Space, usually a local Space. The Space allows decoupling of associations between applications, clients, servers, proxies, etc., and acts as an intermediary. It also allows for typing of objects as well as a notification process for any new objects entered into the Space. Using the Space alleviates the problems with Jini, noted above, when used in combination with the double agents and the Community Service.

Figure 2:
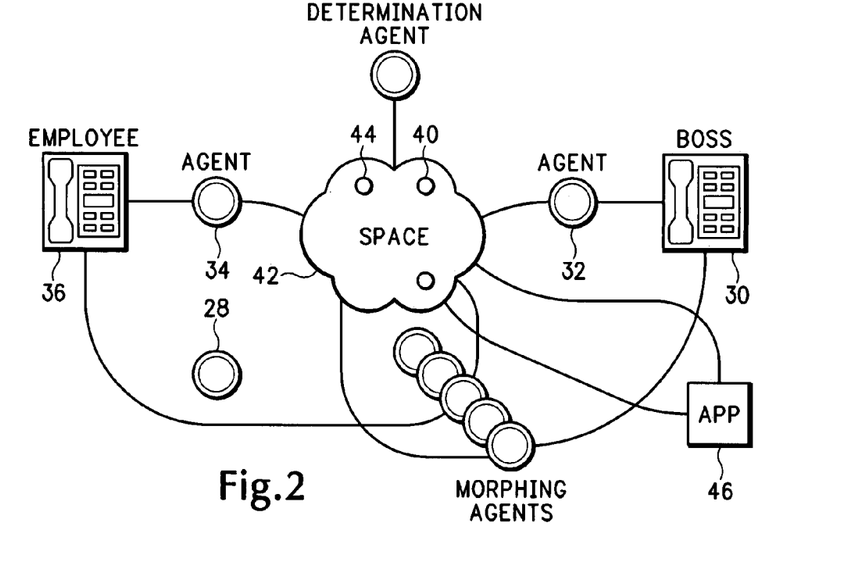
FIG. 2 shows one embodiment of a SI Space and associated agents, in accordance with the invention.

An example of a one-space Community is shown in FIG. 2, as an example of how a Community could be implemented and its interaction with double agents. The members of the Community are not limited to those discussed here, but these are intended as an example of possible members of the Community. As can be seen in FIG. 2, there are two users shown, Boss and Employee. The actual members of the Community are the Boss's phone 30 and the Employee's phone 36. These are each shown as having agents 'connected' to them, agents 32 and 34, respectively. However, as mentioned before these are virtual connections. The Boss's phone may be a SIP phone and it happens to have the agent 32 interacting with it. These agents are double agents, with the ability to communicate with SIP and Space and translate between the two protocols.

The possibilities for other members of the Community is almost limitless. A software application 46 could be a member of the Community. All that is required for a new member to join a Community is the presence of agents that 'speak' the member's language. As will be discussed further, double agents can be written for each new member according to building blocks provided in the class libraries. Writing a new double agent will typically involve providing the necessary APIs (application programming interfaces).

Because of the nature of the Space 42 and the double agents interaction with it, only a limited number of APIs is needed. In one implementation of an SI system, only the following APIs are needed: take, take_if_exists, read, read_if_exists, and notify. In addition to demonstrating the high flexibility of this system, the use of five APIs also keeps the relative sizes of the agents small. However, even with these limited number of APIs a powerful system can be implemented by application of the invention.

For example, as shown in FIG. 2 a Community is established with a Space and a number of agents to establish a telephone system to take the place of a Private Branch Exchange (PBX) within a company site. One of the users, Boss, picks up the phone 30 to call another user, Employee. This process places an object 40 in the Space via a double agent 32. As will be discussed further, in this particular example the agent is a universal double agent discussed below. The double agent in this case speaks 'phone system' on one side and 'Space' on the other. It converts the phone call into an object 40 that can be inserted into the Space 42. The double agent then leases an object in the Space.

Leasing allows the Space to avoid clutter from expired or unanswered objects. The double agent may place a lease on the object 40 generated by the phone call that expires after the amount of time it takes for four rings. After that time expires, the lease on the object expires and the object is removed from the Space.

Once the object is inserted into the Space, the Space invites the double agent 34 that will communicate with the Employee's phone to pick it up. In one embodiment, the double agent will be a 'morphing' double agent, discussed below, that will conform itself to the necessary protocols to handle the object. The double agent 34 picks up the object and transfers it to the employee's phone application. When the employee answers the phone 36, the answering double agent then places another object 44 in the Space that indicates the answer. The answer object 44 then invites the originating double agent and the call is completed as the originating double agent picks up the answer object and returns it to the calling application. Alternatively, the answer could be sent via another double agent, and the answering double agent could be a different double agent that communicates with the Boss phone 30.

In addition to these device/application/etc. specific double agents, there are more general double agents available. One such double agent will be referred to here as a universal double agent. The universal double agent (UDA) 'talks' any protocol or application desiring entry into the Space on one side and Space on the other side. In one implementation of the UDA, an extended Markup Language (XML) wrapper is put around a double agent. The XML wrapper is used as a translator. The device or application identifies which XML tags it wants to use and the UDA uses that to convert the incoming stream and send it to the double agent. There may be some limitations on the functionality of UDAs, however, so the system may approach devices and protocols for which no specific agents exist with a morphing double agent (MDA).

Morphing double agents are similar to double agents in that they have the full span of functionality. They are also similar to UDAs in that they can interact with several different objects. A morphing agent accesses objects in the Space and determines what kind of agent is needed to interact with that object. Alternatively, the Space could be set up to publish information about the agent with the notification and the morphing agents could monitor all publications. Regardless of how the morphing agent determines what kind of agent is needed, once it determines the type, it refers to a system object within the Space. That object (Object Repository Entry) contains a list of agents and their characteristics and then 'morphs' itself into one of those types of agents after it picks up the object.

In this manner, the group of specialized double agents would be replaced with a group of morphing double agents. The system can now be extended to include new devices, protocols, etc., by adding the necessary definitions to the ORE (database) above from which the morphing agents draw their characteristics.

The above agents are the building blocks upon which the fully distributed application system is based. Up to this point in the discussion, the agents have all been general agents that function strictly within a given Space. The smart secretary (SS) agent 28 provides management of user preferences, routing and determination of objects that require interactions outside of the community. In this aspect, it acts almost as a hybrid agent having both space-centric and non-space centric characteristics.

An example of how SS functions is in the phone environment. When a call is placed to a user, the SS picks up the call and handles routing according to the preferences designated by the user. It will use some sort of directory service, such as Lightweight Directory Access Protocol (LDAP). The directory must have the ability to be created and updated, such as through an XML interface. The user will have the ability to update and change preferences through a user-friendly interface, such as a web browser.

When SS picks up the call, it will route it to the specified devices. If the call has a prefix that is outside its call plan or local Space, the SS will invoke another agent, dubbed Determination Agent that will be discussed further. The SS can route the call to more than one device simultaneously. It may also be able to 'smart' route the call. As an example, if the phone rings in an office and no answer occurs, the call may be routed to that person's assistant. If again no answer occurs, the call would be retrieved and routed to the original destination person's voice mail. In typical systems, this would result in the call being routed to the assistant's voice mail.

The agents discussed above are specific to a particular Space. However, the overall distributed application system may have several spaces within it. The agents and services provided within each implementation of the system could vary widely. One example is given with reference to FIG. 3. However, each space will typically have a non-space specific double agent as well as those specific to that space.

Figure 3:
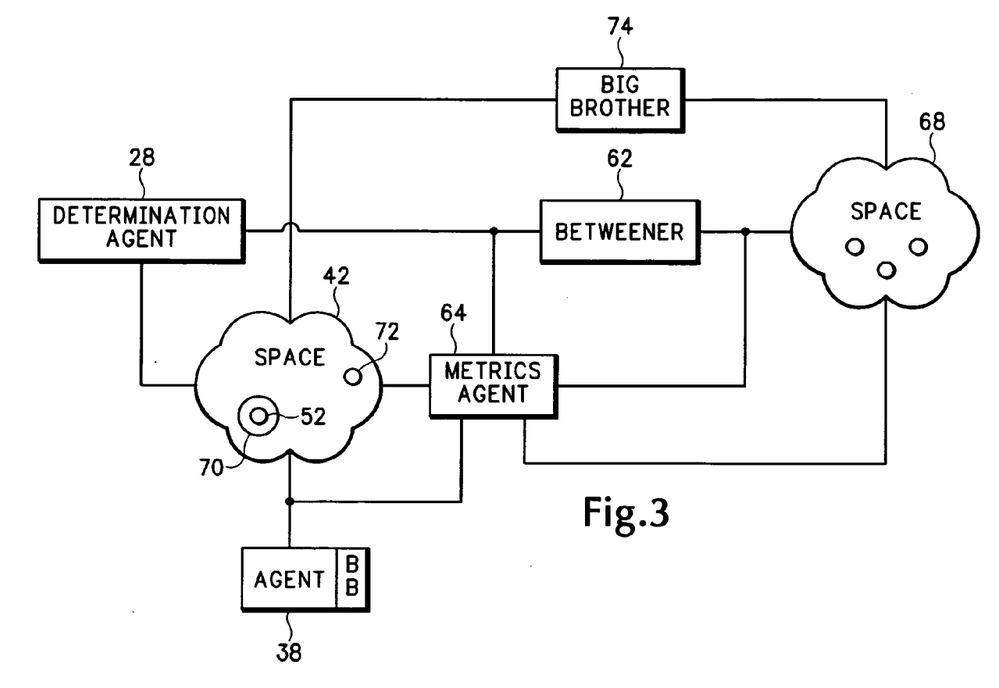
FIG. 3 shows one embodiment of agents functioning in a multiple Space SI system, in accordance with the invention.

As mentioned above, a call outside a call plan or a Space 42 will invoke a double agent, referred to here as Determination Agent 60, one type of a non-space specific double agent. When an object 52 is placed into the Space 42 that the local double agents cannot resolve, the local double agent 38 returns the object 52 to the Space 42 with a Determination Agent wrapper 70 on it. Determination Agent 60 then picks it up and determines to where the object needs to go. If the object needs to move to another community Space 68, Determination Agent will invoke another type of double agent referred to as a Betweener 62.

Betweener, another non-space specific double agent, is a double agent that handles routing and insertion of non-local objects into other community Spaces. The Betweener moves the object from one Space and delivers it to the other community Spaces. Once the object is written, Betweener uses it to form a communication channel between the two Spaces. As mentioned previously, all the objects have leases. When the leases expire for the objects that are being passed between Spaces, the channel ceases to exist, clearing the network between the two Spaces.

In addition to this type of communication management between Spaces, Determination Agent 28 also handles smart routing and load balancing within a given community of Spaces. As the Spaces function as a Community, it will be able to use heuristics and route communications along the most efficient path available.

Determination Agent 28 receives the statistics and information necessary to make those determinations from another type of agent, referred to here as Metrics Agent 64. Metrics Agent does not reside in a Space, but resides in the network. It accesses available network management protocols, such as the Simple Network Management Protocol (SNMP) to gather the necessary network information. Metrics Agent actively feeds the information to all of the Determination Agents in all of the Spaces in the system.

Other types of system maintenance and administration agents may also exist. For example, a Big Brother agent may monitor the systems, the applications and performs audits. It would require administrator privileges for access. Each agent would have a Big Brother component, as can be seen by agent 38 in FIG. 3. The component returns information about applications, the health of the system and the Space, as well as tracing of communications to Big Brother. When a trace of a communication is requested, the Big Brother places an object in the Space 72 identifying the communication to be traced. The involved double agents receive the trace request and write an object into a Space for each step they perform in the communication. The object itself is under lease, so when the lease has expired, the object is removed from the Space. As with all other leases, the Big Brother agent leases the object requesting the trace and can renew it as needed.

Another aspect of Big Brother is a device testing aspect. The entries in a user preferences object are tested to determine if the devices are resident in this community. If a device does not respond to an object placed in the Space inviting that device to pick it up, the device is determined to not be in this community.

Another aspect of maintaining and registering members of the Community that requires attention is the use of access and addressing protocol such as Dynamic Host Configuration Protocol (DHCP) and LDAP. DHCP assigns IP addresses to devices, such as dial-up modems, dynamically. The same address could be used for several different devices at different times. LDAP provides a directory service of devices to be addressed. These protocols can cause some problems in a heavily loaded environment.

The problems can be solved by various methods. For example, a Java™ wrapper could be placed around these types of protocols and load them into the Space. This makes them memory resident. All standard utilities would then continue to function normally.

Alternatively, the protocols could be converted into a Java™ vector or array, which is a list storing mechanism that continually resizes itself. The vector would have a front-end double agent that communicates within the DHCP or LDAP protocol on one side and Space on the other. In either case, these types of services will be resident in memory, reducing wait time for addresses to be assigned.

Another problem that the maintenance and administration of the Space must take into account is failure of machines, agents or Spaces. A special agent referred to as a replication agent handles this problem. It takes the communication channel set-up and replicates it to multiple Spaces. The replication agent then informs the double agents involved in the communication channel of alternate locations if something in the original channel fails. Replication may be done asynchronously to reduce overhead of waiting for all the writes to occur.

The system enables several services for users. As mentioned previously, extending the system to include other devices or interfaces merely requires a double agent to be written for that device or interface. With a morphing double agent, a new entry would need to be made into the database with the necessary characteristics. The system provides a class library of Java™ classes unique to the system. They allow system designers and user to add double agents in a relatively easy way, as the class libraries hold all of the building blocks of the double agents. The class libraries would not be distributed as part of the system, but provided to developers for extensions of the system capabilities.

Another service made possible by this unique system architecture is the ability to 'lurk' outside another user's environment, just as if one person was walking by another person's office. The service will be referred to as Netlurkers. It encapsulates individual and group work environment in a series of web page templates that describe room interactions, which reflect the office environment. This re-establishes an old physical contact paradigm in a new medium. It is no longer just making a call to someone; it exposes the desired reason for the contact in a room predefined for that behavior.

This type of application and general service is available because of the unique architecture of this system. It can be implemented in many different configurations and layers, with many different types of members. Maintenance and administration of the system can be a detailed and complex as desired, or be kept relatively simple. It is extensible and expandable to provide communications between different applications, devices and users.

The system can be implemented in several ways. A typical implementation would be as software provided on some sort of computer-readable medium distributed to several different computing devices, at least two different computing devices. For purposes of this discussion a computing device will be any device with a processor and some amount of memory. Each processor would perform at least part of the method of the invention and be responsible for maintaining part of the system. For example, one processor may maintain a certain number of objects for a given Space. The combination of equipment and software modules desired will depend in a large part upon the specific configuration of the desired capabilities of the communications system.

Figure 4:
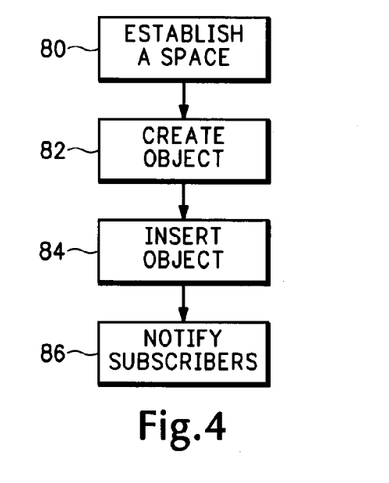
FIG. 4 shows one embodiment of a method for providing a communication system, in accordance with the invention.

Once executed the software would execute the method of the invention as shown in FIG. 4. A Space would be established at 80, with associated agents. An agent creates an object at 82, which will act as a request for an action. The object is inserted into the space at 84. Once the Space recognizes that an object has been inserted, the Space will notify any agents that have subscribed for notification of that type of object at 86.

Having discussed all of the possible components of a scalable infrastructure system, it is now useful to discuss an implementation used to replace a private branch exchange (PBX) within a phone system using one embodiment of an SI system. The system was initially implemented using one JavaSpace™, to connect to SIP phones.

A first agent was written, SIPListener. It filtered the SIP stream from the phones or gateways and translated them into one of three different JavaSpace™ entries: a) an Invitation Entry; b) a Bye entry; or c) a SIP Entry, which is a wrapper for the SIP stream. These entries had the following effects.

When an Invitation Entry is written to the Space, the Space notifies Smart Secretary that an invitation was written that matched a pre-existing notification request. The Smart Secretary then picks up the invitation and interrogates the 'to' fields and the 'from' fields. The Smart Secretary then performs the look up on the registration information and the preferences of each device involved in the call. If the call is from x12345 to x67890, the Smart Secretary would retrieve the registration entry that matches both of these entries. It would also retrieve the Preference Entry for x67890. If no preferences entry exists for x67890, Smart Secretary would write a Double Agent Entry with the information. The Smart Secretary would then return to its monitoring state.

The Double Agent Space Listener, an agent that 'listens' for new entries, would be notified of the Double Agent Entry event being written into the Space. The listener would then pick up this object and registers with the Space to inform the Space of the listener's interest in receiving notifications when a SIP entry is written for either of these two individuals. The listener would then deliver the SIP stream to x67890. Once it has delivered the stream, it monitors the Space for any further entries by either of these two parties. Once this listener receives the final call setup message from these parties, a Call Detail Entry (described below) is written to the Space, and the call setup is complete. The Double Agent Space Listener cancels all of the event notifications from the Space for this call and returns to process more Double Agent Entries. This is a multi-threaded agent with the ability to handle several calls. The source code for a SIP conversation using some of these agents is shown in the Appendix.

The Double Agent SIP Listener delivers a Bye Entry into the Space. A Bye Agent is then notified of this entry and picks up the object Bye Entry. The Bye Agent then finds the current Call Detail Entry written by the Double Agent Space Listener when the call was setup. The Bye Agent matches the CallId of the Bye Entry and the Call Detail Entry. The agent then forwards the bye SIP message to the destination, disconnecting the call. The agent then updates the Call Detail Entry with a time stamp indicating when the call was terminated.

In addition to inside calls such as this one, the system can handle other types of calls as well. For example, if the number dialed was an external number, Smart Secretary may not be able to match a registration for that number. The Smart Secretary then writes out a Determination Agent Entry. The Determination Agent is notified of the entry and picks it up from the Space. Determination agents have dial plan(s) and routing behavior knowledge. This particular Determination Agent matches a dial plan entry that may be for a gateway, for example. The agent provides the address of an available gateway and bundles the entry into a Double Agent Entry with the dialed number address and port for the gateway and then returns to monitoring the Space. Calls from the gateway are handled in a similar fashion, with the Determination Agent filling in the registration for entering the Space.

If the dialed number is a call that is outside this particular Space, but is in another Space, Determination Agent writes a Betweener Entry. The Determination Agent is now done with this call. However, a Betweener Agent gets notified of the entry and picks up the call. Betweener Agent then acts like a Double Agent Space Listener to carry the information between the local extension and the extension outside the first space. Invitations carried to the other Space are handled by the Smart Secretary in that Space. The Smart Secretary will only have to watch one listener, the one that is in the second Space, having been notified that the other listener is in the other Space.

In this implementation, it is possible to see both the scalability and extensibility of this architecture. There is no limit on the number of agents of each type, nor the types of agents. No single agent retains any particular state. Once the call is setup and continuing, there are no load or resources being utilized, no threads being used to process the calls.

Thus, although there has been described to this point a particular embodiment for a method and apparatus for a fully distributed communication system, it is not intended that such specific references be considered as limitations upon the scope of this invention except in-so-far as set forth in the following claims.

What is claimed is:

1. A communication system, comprising:
    at least one community, each community comprised of:
        a community service to manage the communication system, wherein managing the communications system includes registering distributed, persistent stores, agents and services and the community service monitors, stops, re-starts, and clones stores, agents and services without requiring administrative intervention;
        at least one distributed, persistent store having publish and subscribe capability and communicating using a first protocol; and
        at least one double agent, operable to communicate with entities making and receiving telephone calls using a second protocol and the persistent store using the first protocol; and
    at least one non-space specific double agent, operable to communicate with persistent stores outside the community using the first protocol by taking any objects from at least one persistent store in the community intended for a persistent store in another community and transferring the objects to the persistent store in another community wherein the objects intended for the persistent store in another community are telephone calls intended for users that are members of the other community.

2. The communication system of claim 1, wherein the at least one double agent further comprises a universal double agent (UDA) capable of communicating with the persistent store and any entity.

3. The communication system of claim 1, wherein the at least one double agent further comprises a morphing double agent (MDA) capable of adopting characteristics to communicate with any entity.

4. The communication system of claim 1, wherein the at least one double agent further comprises at least one device specific double agent.

5. The communication system of claim 1, wherein the at least one non-space specific double agent further comprises a determination agent.

6. The communications system of claim 1, further comprising a Dynamic Host Configuration Protocol object residing in the persistent store to provide network addresses to members of the community.

7. The communications system of claim 1, further comprising a Lightweight Directory Access Protocol object residing in the persistent store to provide a directory of services.

8. A method of providing communications, the method comprising:
    establishing a distributed, persistent store having a publish and subscribe capability;
    providing a community service to manage a communications system including the persistent store, wherein managing the communication system includes registering persistent stores and other members with a community service to manage the communication system, wherein managing the communications system includes registering distributed, persistent stores, monitoring, stopping, re-starting and cloning agents and services without requiring administrative intervention;
    inserting an object into the persistent store using a first protocol to communicate with the persistent store, wherein the object is generated by a double agent in communication with a member of a Community placing a telephone call using a second protocol requesting an action;
    providing notification to subscribed members of the Community of the insertion of the object into the persistent store; and
    transferring objects from the persistent store in the Community to a persistent store in another Community using a non-space specific double agent communicating with the first protocol because a called user is a member of the other Community.

9. The method of claim 8, wherein the method further comprises reinserting objects intended for other spaces into the persistent store.

10. The method of claim 8 wherein the persistent store, the double agent and the subscribed members reside on at least two different computing devices.

11. The method of claim 8 wherein the object inserted includes a wrapper addressed for a determination agent.

12. A computer-readable medium, wherein the medium includes instructions, that when executed by a computer, results in:
    establishment of a distributed, persistent store having a publish and subscribe capability;
    management of a communications system including the persistent stores wherein management includes registering distributed, persistent stores, agents and services and the community service monitors, stops, re-starts and clones stores, agents and services without requiring administrative intervention;

insertion of an object representing an incoming telephone call into the persistent store using a first protocol to communicate with the persistent store, wherein the object is generated by a double agent in communication with a member of a Community placing the call;

providing notification to subscribed members of the Community of the insertion of the object into the persistent store; and transferring objects from the persistent store in the Community to a persistent store in another Community when a called user does not reside in the Community using a non-space specific double agent communicating with the first protocol.

13. The computer-readable medium of claim 12, wherein the medium is comprised of at least two computing devices.

14. A network device including a processor and a memory, the processor configured to:

establish a distributed, persistent store in the memory;

execute an agent to generate an object in response to a request from a member of a Community using a second protocol to communicate with the member, wherein the object represents a telephone call;

provide a community service for registering persistent stores and agents within a community, the community service being self-healing in that agents and services within a Community are monitored, stopped, re-started, and cloned by the community service without requiring administrative intervention; and insert the object into the persistent store using a first protocol, wherein the persistent store provides notification to subscribed members of the Community of the insertion of the object into the persistent store by taking any objects from at least one persistent store in the community intended for a persistent store in another community, wherein the telephone call is intended for a party in another community, and transferring the objects to the persistent store in the other community using a non-space specific double agent communicating with the first protocol.

15. A method of providing communications, the method comprising:

receiving a telephone call from a first user;

using a double agent to generate an object representing the telephone call, wherein the object identifies a called party and the double agent communicates with the first user using a first telephone protocol;

inserting the object into the persistent store using a second protocol;

providing notification to subscribed members of a Community of the insertion of the object into the persistent store;

managing of a communications system that includes the persistent stores wherein managing includes registering distributed, persistent stores, agents and services and the community service monitors, stops, re-starts, and clones stores, agents and services without requiring administrative intervention;

determining that the object is unresolvable by any member of the Community because the called user does not reside in the Community;

transferring the object from the persistent store in the Community to a persistent store in another Community in which the called user resides using a non-space specific agent communicating with the first protocol;

resolving the object in the other Community; and sending a call notification to the called party using a third telephone protocol.

16. A network device, comprising:

means for establishing a distributed, persistent store in the memory;

means for executing an agent to generate an object in response to a request from a member of a Community using a first protocol;

means for providing a community service for registering persistent stores and agents within a community; and means for inserting the object into the persistent store using a second protocol, wherein the persistent store provides notification to subscribed members of the Community of the insertion of the object into the persistent store by taking any objects from at least one persistent store in the community intended for a persistent store in another community and transferring the objects to the persistent store in another community using a non-space specific double agent communicating with the second protocol.

* * * * *

UNITED STATES PATENT AND TRADEMARK OFFICE
CERTIFICATE OF CORRECTION

| | | |
|---|---|---|
| PATENT NO. | : 7,246,145 B1 | Page 1 of 1 |
| APPLICATION NO. | : 09/676147 | |
| DATED | : July 17, 2007 | |
| INVENTOR(S) | : Peter M. Gits and Dale J. Seavey | |

It is certified that error appears in the above-identified patent and that said Letters Patent is hereby corrected as shown below:

At column 14, line 30, please replace "a request" with --an incoming telephone call--

At column 14, line 33, please replace "a community;" with --a community, the community service being self-healing in that agents and services within a Community are monitored, stopped, re-started, and cloned by the community service without requiring administrative intervention;--

Signed and Sealed this

Sixteenth Day of October, 2007

JON W. DUDAS
*Director of the United States Patent and Trademark Office*